United States Patent
Kindberg et al.

(10) Patent No.: US 8,500,004 B2
(45) Date of Patent: Aug. 6, 2013

(54) OBTAINING A RESOURCE TO READ A SYMBOL

(75) Inventors: Timothy Paul James Kindberg, Bristol (GB); Andrew C. Goris, Loveland, CO (US); Timothy Louis Kohler, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 77 days.

(21) Appl. No.: 13/125,571

(22) PCT Filed: Oct. 22, 2008

(86) PCT No.: PCT/US2008/080805
§ 371 (c)(1),
(2), (4) Date: Jul. 6, 2011

(87) PCT Pub. No.: WO2010/047701
PCT Pub. Date: Apr. 29, 2010

(65) Prior Publication Data
US 2012/0018508 A1    Jan. 26, 2012

(51) Int. Cl.
*G06F 17/00* (2006.01)
(52) U.S. Cl.
USPC .......................................... 235/375; 235/487
(58) Field of Classification Search
USPC ..................... 235/375, 487, 472.01
See application file for complete search history.

(56) References Cited

U.S. PATENT DOCUMENTS

| 2001/0034222 A1 | 10/2001 | Roustaei et al. |
| 2002/0051061 A1* | 5/2002 | Peters et al. ................. 348/207 |
| 2007/0063050 A1 | 3/2007 | Attia et al. |
| 2007/0274561 A1 | 11/2007 | Rhoads et al. |
| 2008/0290987 A1* | 11/2008 | Li ................................ 340/5.1 |

FOREIGN PATENT DOCUMENTS

KR    20010086880 A    9/2001

OTHER PUBLICATIONS

Collomosse, J. P. et al., "Screen Codes: Visual Hyperlinks for Displays", downloaded Oct. 21, 2008.
International Search Report and Written Opionion of the International Searching Authority, or the Declaration, Jun. 22, 2009, 12 pages.
Robinson, G., "New App Reads Barcodes on iPhone", http://www.geek.com/new-app-reads-barcodes-on-iphone-20080815/, Aug. 2008.

* cited by examiner

*Primary Examiner* — Edwyn Labaze (57) ABSTRACT

In a method for obtaining a resource to read a symbol, an image containing at least one of the symbol and an indicator of the symbol is obtained. At least a portion of the obtained image is sent to a symbol identification service and the resource from the symbol identification service is received, wherein the resource enables the symbol to be read.

18 Claims, 6 Drawing Sheets

OBTAINING A RESOURCE TO READ A SYMBOL

RELATED APPLICATIONS

The present invention is related to GB Serial No. 0714666.5, titled, "Content Encoder and Decoder and Methods of Encoding and Decoding Content," filed on Jul. 27, 2007; GB Serial No. 0714664.0, titled, "An Encoder and Decoder And Methods of Encoding and Decoding Sequence Information," filed on Jul. 27, 2007; GB Serial No. 0714661.6, titled, "A Method of Generating a Sequence of Display-Frames for Display on a Display Device" filed on Jul. 27, 2008; PCT Application Serial No. PCT/US2008/080796, titled, "Altering An Imaging Parameter To Read A Symbol," filed on Oct. 22, 2008; Application Serial No. PCT/US2008/080816, titled, "Processing Images Of A Display," filed on Oct. 22, 2008. The disclosures of the above-identified documents are hereby incorporated-by reference in their entireties.

BACKGROUND

Conventional barcodes have enabled items, such as goods for sale or mail within a mail system, to be marked and later identified by a suitable barcode reader. These barcodes may be printed in newspapers, magazines, on signs, buses, business cards, embedded in content of web pages, displayed on monitors, and on just about any other print or display that a user might desire.

In addition, it is increasingly becoming an established practice to use barcodes to move content from the Internet to camera-equipped mobile phones and vice versa. In these instances, barcodes are scanned or "imaged" by a barcode reader and then used as a basis for uploading and downloading content and services over the Internet. For instance, a music store may display a monitor having an embedded symbol (or sequence of symbol portions) corresponding to a music track, the name of a song, and an artist. In this example, a camera-equipped mobile phone may "image" the barcode and then use the barcode as a basis to download the music track, the name of the song, and the artist. In this regard, a barcode reader is operating as a high-level application. Conventional barcode readers, however, are often capable of recognizing a limited set of barcode types and are thus unable to obtain content related to barcodes that the conventional barcode readers have not been programmed to recognize.

It would therefore be beneficial to provide a system that enables recognition of a large variety of barcodes.

BRIEF DESCRIPTION OF THE DRAWINGS

Features of the present invention will become apparent to those skilled in the art from the following description with reference to the figures, such reference being made by way of example only, in which.

DETAILED DESCRIPTION OF THE INVENTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are a method and an apparatus for obtaining a resource to enable an electronic device to read a symbol. Reading may include both recognizing and decoding. Also disclosed herein is a method for sending the resource to an electronic device to enable the electronic device to read a symbol. The resource may comprise, for instance, a plug-in for firmware or a plug-in for a higher-level application software. A resource should not be construed as the result of the symbol being recognized by a server-based symbol decoder. For example, a resource may enable an electronic device to read new types of symbols and additional types of symbols beyond that which could be read before receiving the resource.

According to a method, when an electronic device encounters a symbol that the electronic device is unable to read, the electronic device is configured to receive a resource that enables the electronic device to read the unrecognized symbol. More particularly, for instance, the electronic device sends at least a portion of an image, which contains at least one of the symbols and an indicator of the symbol to a symbol identification service. The symbol identification service is configured to determine an appropriate resource to enable the electronic device to be able to read the symbol from the at least a portion of the image. In addition, the symbol identification service is configured to send the resource to the electronic device. The electronic device is configured to implement the resource to read the previously unrecognizable or decodeable symbol.

A symbol may be defined as a barcode or other glyph on a printed media. A symbol may also be a visually-symbolic resource that is embedded in a display as anyone or more portions of video, frame, image, or picture, etc. In addition, a symbol may be of a symbology taking the form of 10 or 20 barcode symbology, for instance, UPC Symbology (Universal Product Code), Datamatrix Symbology (ISO/IEC16022-International Symbology Specification), QR Codes (JIS X 0510, ISO/IEC 18004:2000, ISO/IEC 18004:2006), Color Codes, etc. The symbols discussed herein may thus comprise a conventional barcode or a visually symbolic resource embedded in a display such as disclosed in greater detail in U.S. patent application Ser. No. 13/125,645, titled, "Eliminating Flicker From A Video," filed on Jul. 11, 2011.

The method disclosed herein accommodates the resolution and optics of a typical electronic device equipped with imaging capabilities. For instance, the method disclosed herein may be implemented by a camera-equipped mobile phone, a smart phone, a personal data assistant (PDA), etc. Further, the method and apparatus for its use disclosed herein enable a user to simultaneously be mobile and easily upgrade an imaging recognition system to access content over the Internet and/or other network or to directly access "in-line" content from the image.

Through implementation of the method disclosed herein, a robust mechanism is provided that processes an image to enable reading of a previously unreadable symbol.

Figure 1:
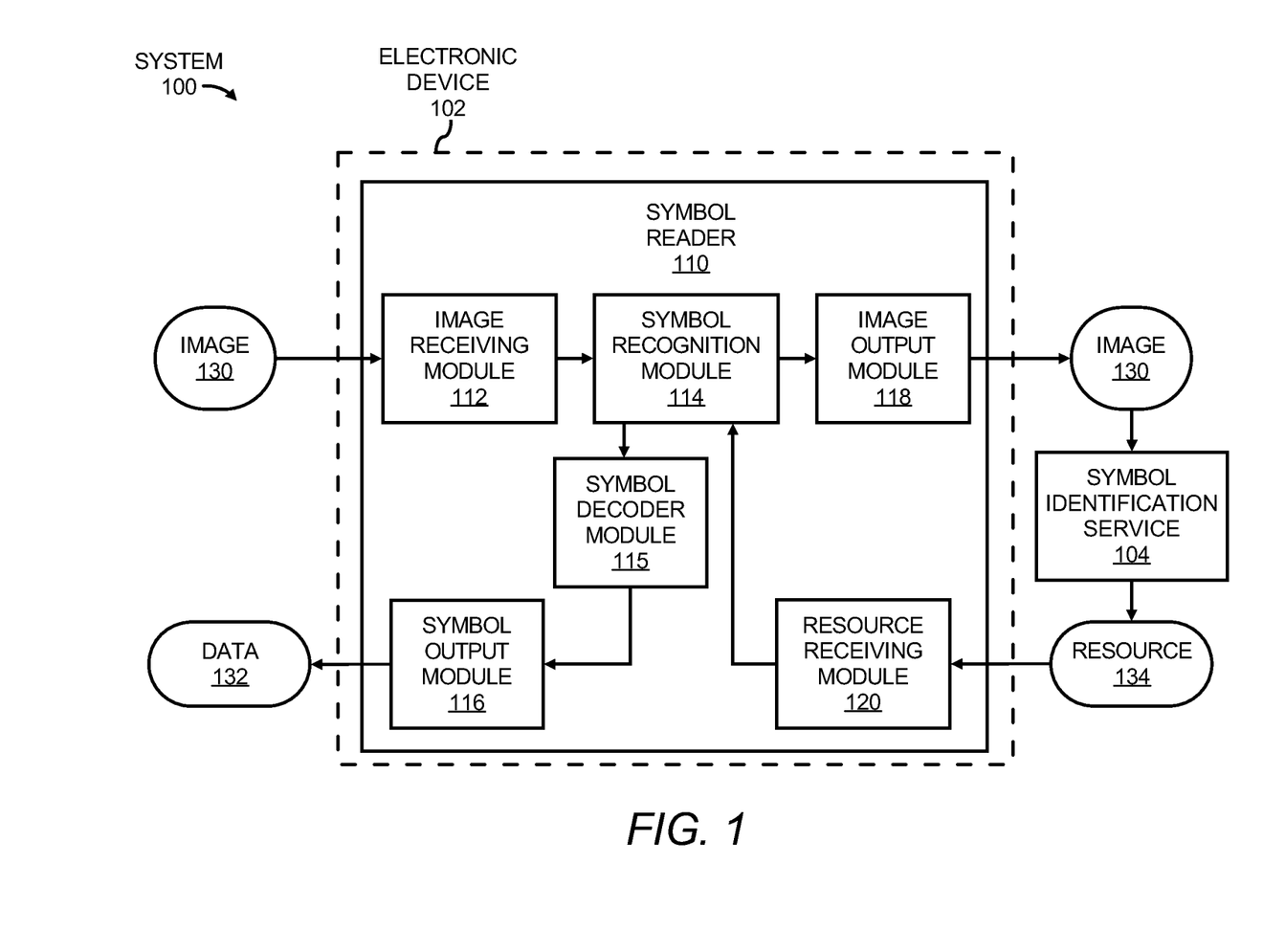
FIG. 1 illustrates a simplified block diagram of a system 100 for enabling an electronic device to read a symbol, according to an embodiment of the invention.

Turning first to FIG. 1, there is shown a simplified block diagram of a system 100 for enabling an electronic device 102 to read a symbol, according to an example. More particularly, for instance, the system 100 may be configured to enable the electronic device 102 to read unrecognized symbols. It should be understood that the system 100 may include additional components and that some of the components described herein may be removed and/or modified without departing from the scope of the system 100.

As shown in FIG. 1, the system 100 includes the electronic device 102 and a symbol identification service 104. The electronic device 102 may comprise any reasonably suitable device in which a symbol reader 110 may be implemented. In this regard, the electronic device 102 may comprise a personal computer, a cellular telephone, a personal digital assistant (PDA), etc. In addition, the electronic device 102 may comprise a camera-equipped device, such as, a camera-equipped cellular telephone, a camera-equipped personal computer, a camera-equipped PDA, etc. Thus, although not shown, the electronic device 102 may include additional components, such as, a processor, a memory, input devices, output devices, image capturing components, etc.

The symbol reader 110 may comprise software, firmware or hardware configured to recognize a symbol in an image 130. Generally speaking, the symbol reader 110 is configured to one or more of read a recognized symbol contained in the image 130, automatically suspect that an unrecognized symbol is contained in the image 130, non-automatically suspect that an unrecognized symbol is contained in the image 130 (meaning to receive manual and/or verbal instructions from a user indicating that the image 130 contains a symbol or is suspected to contain a symbol). For example, the symbol reader 110 may be configured to receive instructions from a user who either suspects or knows that the image 130 contains a symbol instead of or in addition to automatically suspecting that a symbol is contained in the image 130. In addition, or alternatively, the symbol reader 110 is configured to one or more of read an indicator of a symbol contained in an image 130. The indicator of the symbol may comprise, for instance, text or other indicia that identifies the symbol type, and may be displayed or otherwise presented near the symbol.

In any regard, the symbol reader 110 is configured to read a recognized symbol and to receive a resource to enable the symbol reader 110 to read an unrecognized symbol or a symbol for which the symbol reader 110 recognizes but does not have the appropriate software to decode.

As shown, the symbol reader 110 includes an image receiving module 112, a symbol recognition module 114, a symbol decoder module 115, a symbol output module 116, an image output module 118, and a resource receiving module 120.

In instances where the symbol reader 110 comprises software, the symbol reader 110 may be stored on a computer readable storage medium and may be executed by the processor of the electronic device 102. In these instances, the modules 110-120 may comprise software modules or other programs or algorithms configured to perform the functions described herein below. In instances where the symbol reader 110 comprises firmware or hardware, the symbol reader 110 may comprise a circuit or other apparatus configured to perform the functions described herein. In these instances, the modules 110-120 may comprise one or more of software modules and hardware modules.

The symbol identification service 104 comprises, for instance, a network-accessible service provided by a content provider. The symbol identification service 104 is generally configured to identify multiple types of symbols, to identify resources that enable reading (recognition/decoding) of the multiple types of symbols, and to communicate resources to electronic devices to enable the electronic devices to be able to read (recognize and decode) one or more symbol types.

Examples of methods in which the symbol reader 110 and the symbol identification service 104 may be employed to enable an electronic device 102 to read a symbol will now be described with respect to the following flow diagrams of the methods 200, 220, and 300 respectively depicted in FIGS. 2A, 2B, and 3. It should be apparent to those of ordinary skill in the art that the methods 200, 220, and 300 represent generalized illustrations and that other steps may be added or existing steps may be removed, modified or rearranged without departing from the scopes of the methods 200, 220, and 300.

The descriptions of the methods 200, 220 and 300 are made with reference to the system 100 illustrated in FIG. 1, and thus refers to the elements cited therein. It should, however, be understood that the methods 200, 220 and 300 are not limited to the elements set forth in the system 100. Instead, it should be understood that the methods 200, 220 and 300 may be practiced by a system having a different configuration than that set forth in the system 100.

Some or all of the operations set forth in the methods 200, 220 and 300 may be contained as utilities, programs or subprograms, in any desired computer accessible medium. In addition, the methods 200, 220 and 300 may be embodied by computer programs, which may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form.

Exemplary computer readable storage devices that may be used to implement the present invention include but are not limited to conventional computer system RAM, ROM, EPROM, EEPROM and magnetic or optical disks or tapes. Concrete examples of the foregoing include distribution of the programs on a CD ROM or via Internet download. In a sense, the Internet itself is a computer readable medium. The same is true of computer networks in general. It is therefore to be understood that any electronic device and/or system capable of executing the functions of the above-described embodiments are encompassed by the present invention.

A controller, such as a processor (not shown), ASIC, microcontroller, etc., of the electronic device 102 may implement or execute the symbol reader 110 to perform either or both of the methods 200 and 220 in enabling symbols of various types to be read. Alternatively, the symbol reader 110 is configured to operate independently of any other processor or computing device. Furthermore, the methods 200 and 220 may be performed by an imaging pipeline component, such as, a digital signal processor, or any number of imaging pipeline components, which may be implemented in the operation of an image processing device.

Figure 2A:
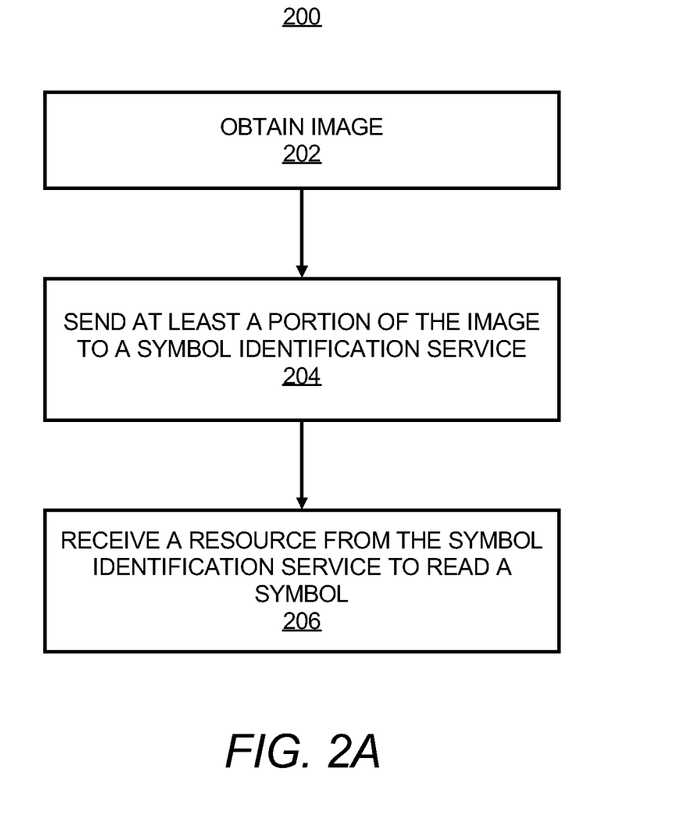
FIG. 2A illustrates a flow diagram of a method for obtaining a resource to read a symbol by an electronic device, according to an embodiment of the invention.

In any regard, with reference first to FIG. 2A, there is shown a flow diagram of a method 200 for obtaining a resource to read a symbol by an electronic device 102, according to an example. At step 202, the image receiving module 112 obtains an image 130 containing at least one of the symbol and an indicator of the symbol. The image 130 may be in any of a number of formats, for instance, JPEG, MPEG, PNG, BMP, GIF, TIFF, etc.

At step 204, the image output module 118 sends at least a portion of the obtained image to a symbol identification service 104. According to an example, the image output module 118 operates with a wireless communication module (not shown) in the electronic device 102 to communicate the at least a portion of the obtained image 130. In other words, the image output module 118 may establish a connection, for instance, through a universal resource locator (URL) of the symbol identification service 104 and may wirelessly transmit the at least a portion of the obtained image 130 through the connection.

At step 206, the resource receiving module 120 receives a resource from the symbol identification service, where the resource enables the symbol reader 110 to decode the symbol and/or symbols of the same type as the symbol. The resource comprises a plug-in for firmware or a high-level application software of the symbol reader 110. Thus, for instance, the resource enables the symbol reader 110 to read a previously unrecognizable symbol without requiring that completely new software be installed into the electronic device 102. In addition, the resource enables the symbol reader 110 to read other symbols having the same or similar symbol type. In this regard, the symbol reader 110 may not be required to obtain the resource again to read a different symbol of the same type.

Figure 2B:
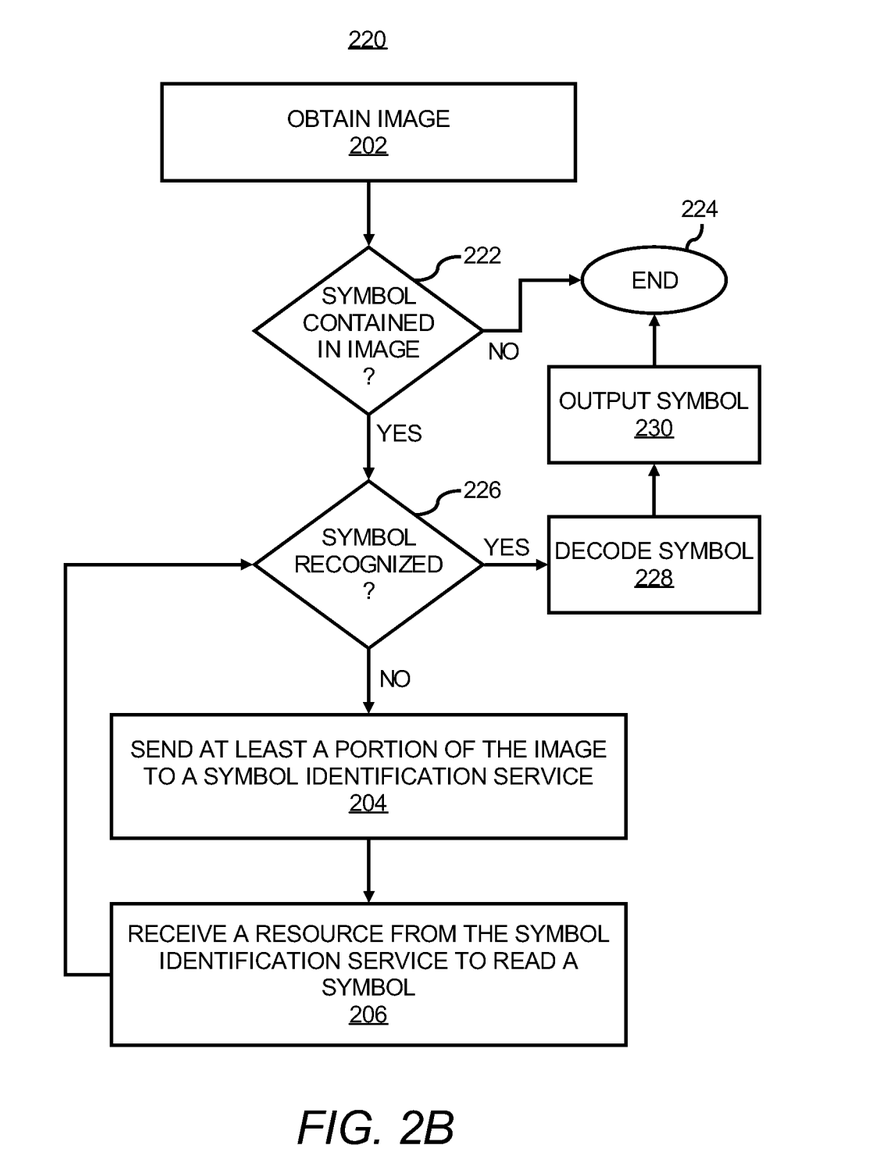
FIG. 2B illustrates a flow diagram of a method for obtaining a resource to read a symbol by an electronic device, according to another embodiment of the invention.

Turning now to FIG. 2B, there is shown a flow diagram of a method 220 for obtaining a resource to read a symbol by an electronic device 102, according to another example. The method 220 depicted in FIG. 2B is similar to the method 200 depicted in FIG. 2A and contains similar steps. The method 220, however, differs from the method 200 in that the method 220 contains additional steps. As such, detailed descriptions of steps having the same reference numerals are not repeated here with respect to the method 200.

More particularly, for instance, the method 220 depicts an example when the symbol recognition module 114 is able to either or both of recognize and read at least one of a symbol and a symbol indicator.

At step 202, the image receiving module 112 obtains an image 130 containing at least one of the symbol and a symbol indicator.

At step 222, the symbol recognition module 114 determines whether the image 130 contains a symbol. According to an example, the symbol recognition module 114 may automatically suspect that the image 130 contains a symbol and/or receiving an instruction from a user that the image 130 either contains a symbol or is suspected to include a symbol. More particularly, for instance, the symbol recognition module 114 may suspect that an image contains a symbol or a symbol indicator through detection of discontinuities, colors, patterns, or other metrics, such as image entropy, in the image 130. As another example, the symbol recognition module 114 may suspect that an image 130 contains a symbol based upon recognition of text contained in the image 130 that indicates the presence of the symbol (an indicator of the symbol).

The symbol reader 110 may prompt a user to verify that the image 130 contains a symbol or a symbol indicator in instances where the symbol recognition module 114 suspects that the image contains a symbol or symbol indicator. Otherwise, the symbol reader 110 may operate under the assumption that the image 130 contains a suspected symbol.

If the symbol recognition module 114 determines that the image 130 does not contain a symbol or a symbol indicator, either automatically or non-automatically through user input, the method 220 may end, as indicated at step 224.

According to another example, the symbol recognition module 114 may receive an indication that the image 130 contains a symbol from user input, with or without being prompted by the symbol reader 110.

In any regard, if the symbol recognition module 114 determines or is instructed that a symbol or a symbol indicator is present in the image 130, the symbol recognition module 114 may attempt to recognize the symbol, as indicated at step 226. If the symbol recognition module 114 recognizes the symbol, the symbol decoder module 115 decodes the symbol, as indicated at step 228. In addition, at step 230, the symbol output module 116 may output data 132 representing the decoded symbol.

The data 132 may be outputted to any of a number of different outputs, such as, a memory of the symbol reader 110, a display screen of the electronic device 102, a network or Internet interface device through which the data 132 may be communicated to a service configured to supply content to the electronic device 102 based upon the data 132, etc. The data 132 may, therefore, comprise, in-line content displayed for a user, in-line content outputted from an electronic device, and/or a resource locator, for instance, a hyperlink to various content, for instance, available over a network, such as, the Internet, etc.

If, however, at step 226, the symbol recognition module 114 is unable to recognize the symbol, the image output module 118 sends at least a portion of the image 104 containing the symbol or the symbol indicator to a symbol identification service 104. Alternatively, the image output module 118 may send at least a portion of the image 104 containing the symbol or symbol indicator to the symbol identification service 104 in instances where the symbol recognition module 114 recognizes the symbol, but does not contain the appropriate software to read the symbol. In this example, therefore, the symbol recognition module 114 may receive the resource 134 to thus be able to read the recognized symbol, as described below.

In any regard, the image output module 118 may send the image 104 through a cellular network, for instance, as described above at step 204. Various manners in which the symbol identification service 104 operates are described in greater detail herein below with respect to the flow diagram 300 depicted in FIG. 3. Generally speaking, however, the symbol identification service 104 operates to supply the symbol reader 110 with a resource 134 to enable the symbol reader 110 to read the symbol.

At step 206, the resource receiving module 120 receives the resource 134 from the symbol identification service 104. In addition, the symbol recognition module 114 may implement the resource 134 in attempting to recognize the symbol, as indicated at step 226. The symbol recognition module 114 may, for instance, install the resource 134 as a plug-in to the symbol recognition module 114. By way of example, the installation of the resource 134 may enable the symbol recognition module 114 to at least be able to read the previously unrecognized/unreadable symbol. The symbol reader 110 may further perform steps 228 and 230 on the recognized symbol, as discussed above.

According to an example, prior to performing step 204, the symbol reader 110 may prompt the user as to whether or not to send the at least a portion of the image to the symbol identification service 104. In this example, the image output module 118 may communicate the image 130 to the symbol identification service 104 in response to a user command.

According to a further example, at least the portion of the image 130 containing the symbol or symbol indicator may be processed prior to the at least a portion of the image being sent to the symbol identification service 104 at step 204. In fact, at least the portion of the image 130 containing the symbol or symbol indicator may be processed prior to either steps 222 or 226. In any regard, the image 130, or a portion thereof, may be processed to enhance the likelihood of the symbol being recognized by the symbol recognition module 114 and/or the symbol identification service 104.

By way of example, the image 130 may be optimized before it (or a portion of the image 130) is sent to the symbol identification service 104. For example, the image 130 may be processed by obtaining a higher resolution image 130 of an area containing the symbol or symbol indicator. As another example, the image 130 may be processed by altering one or more characteristics of the image, such as, altering low-level imaging parameters, including focus, exposure, tone curve, white balance, and offset to more efficiently and effectively read barcodes. As yet another example, the best image of a sequence of images (or a portion of the best image of a sequence of images) may be chosen as the basis of the image (or image-portion) to be sent to the symbol identification service 104. For example, the user may be directed to take a sequence of images while moving the camera, or the program may take a sequence of images while altering the focus or other imaging parameters (one or more low level parameters, one or more high parameters, or any combination thereof). It should be understood however that one embodiment of the present invention comprises employing any combination of optimization techniques before the image 130 (or portion of the image 130) is sent to the symbol identification service 104. A more detailed discussion of manners in which the image 130 may be process is described in co-pending and commonly assigned U.S. patent application Ser. No. 13/122, 433. As a yet further example, the image 130 may be processed by reducing a bandwidth required to transmit the at least a portion of the image to the symbol identification service 104.

Figure 3:
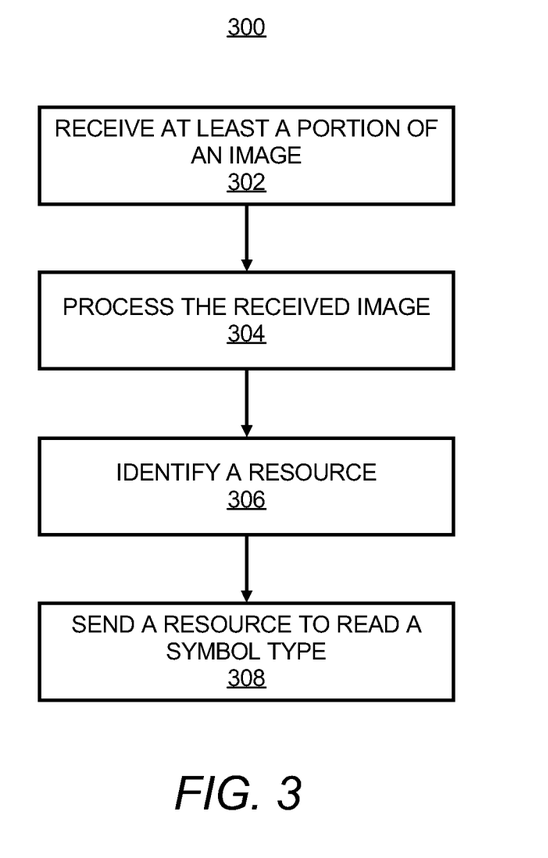
FIG. 3 illustrates a flow diagram of a method for retrieving and sending a resource to an electronic device, according to an embodiment of the invention.

Turning now to FIG. 3, there is shown a flow diagram of a method 300 for retrieving and sending a resource 134 to an electronic device 102, according to an example. Thus, for instance, the method 300 may be performed between steps 204 and 206 in FIGS. 2A and 2B in the symbol identification service 104.

At step 302, the symbol identification service 104 receives at least a portion of an image 130 containing at least one of a symbol and a symbol indicator from a symbol reader 110. The symbol identification service 104 may comprise a service available over the Internet and may receive the at least a portion of the image 130 from a wireless connection between the electronic device 102 and the Internet.

Although not explicitly depicted in FIG. 3, the symbol identification service 104 may also receive information pertaining to the type of operating system under which the symbol reader 110 is configured to run, the versions of various programs operating in the electronic device 102, etc. As discussed in greater detail below, the symbol identification service 104 may employ this information in identifying a resource that is compatible with the symbol reader 110/electronic device 102 that submitted the image 130.

At step 304, the symbol identification service 104 processes the received image 130 to identify a symbol type corresponding to the symbol contained in the received image 130. More particularly, for instance, the symbol identification service 104 determines one or more characteristics of the symbol or the symbol indicator, such as, color, shape, patterns, distortions, text recognition, etc., in identifying the symbol type of the symbol contained in the image 130. In one respect, compared with the electronic device 102, the symbol identification service 104 is able to access relatively powerful computing resources to identify the symbol type. In addition, the symbol identification service 104 may be programmed to identify a large number of symbol types and may easily be upgraded as new symbol types become available. In addition, the symbol identification service 104 may attempt to read the symbol beginning with each reader at its disposal and the symbol identification service 104 may identify the symbol type of the symbol based upon which of the readers (if any) is able to read the symbol.

At step 306, the symbol identification service 104 identifies a suitable resource 134 for the identified symbol type. More particularly, the symbol identification service 104 identifies a resource 134 (plug-in or other software) that is designed to enable the symbol reader 110 to recognize the symbol contained in the received image 130. The symbol identification service 104 may consider factors in addition to the symbol type in identifying the suitable resource 134 at step 306. For instance, the symbol identification service 104 may also determine which resource 134 is compatible with the components contained in the electronic device 102.

At step 308, the symbol identification service 104 sends the identified resource 134 to the symbol reader 110 that submitted the image 130. In one example, the symbol identification service 104 may also read the symbol contained in the image 130 and may also send data 132 corresponding to the symbol contained in the image 130 to the symbol reader 110.

Figure 4:
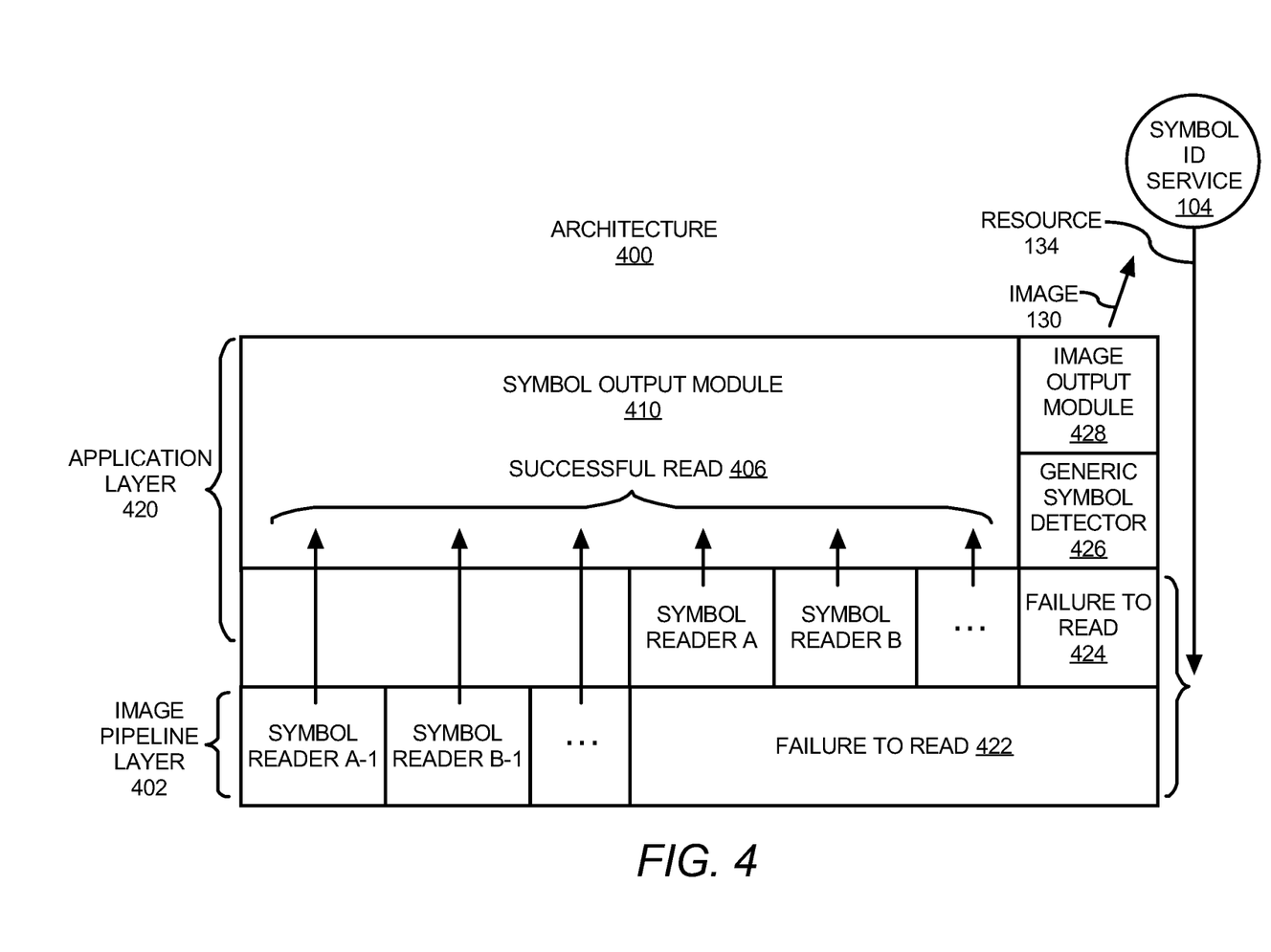
FIG. 4 illustrates a layered architecture of the symbol reader 110 depicted in FIG. 1, according to an embodiment of the invention.

Turning now to FIG. 4, there is shown a layered architecture 400 of the symbol reader 110 depicted in FIG. 1, according to an example. It should be understood that the layered architecture 400 may include additional layers and that some of the layers described herein may be removed and/or modified without departing from the scope of the layered architecture 400.

As shown in FIG. 4, the layered architecture 400 comprises a lower level image pipeline layer 402 and an application layer 420. The symbol identification service 104 is also depicted in FIG. 4.

The image pipeline layer 402 contains a generic (or non-symbol-specific) method 426 of detecting whether a symbol exists in an image (or portion thereof). When a possible symbol is detected, the symbol recognition module 114 applies one or more of the symbol readers (A-1, B-1, C-1, and so forth, or A, B, C, and so forth) to the image or portion thereof. Each symbol reader may be either "built-in" or added as a resource 134. If the symbol is recognized by one of the loaded symbol readers at step 226, then the recognized symbol is passed to the symbol decoder module 115 to be decoded at step 228. If the symbol is not recognized by one of the loaded symbol readers at step 226, then at least a portion of the image is sent to the image output module 428 to be identified (recognized) by the symbol identification service 104 at step 204. Upon receiving and processing the at least a portion of the symbol, the symbol identification service 104 sends a resource to the symbol reader 110 that can be loaded thereon. For instance, the sent resource can be any one of the symbol readers illustrated in FIG. 4.

The symbol reader 110 may run all the local type-specific symbol readers over the image (or image portion). Reading includes both recognition and decoding of the symbol. If one of the symbol readers reads a value, then the symbol is decoded at the symbol detector module 115 as described herein. Otherwise, the image (or image portion) is sent to the generic symbol detector 426. If the generic symbol detector 426 detects what appears to be a symbol (of some unknown type), the output module 428 outputs the image (or image portion) to the symbol identification service 104 for processing as described herein. It should be understood that decoding described herein is symbol-type specific and is thus not generic. Similarly, each reader is symbol-type specific. Although not shown, a non-type specific symbol or generic symbol detector may be either at the image pipeline layer 402 or the application layer 420, or both.

As an example, the image pipeline layer 402 is configured to recognize a symbol or a symbol indicator in the lower layer of the layered architecture 400. Upon recognition, the type and value of the symbol are produced by the image pipeline layer 402 to a successful read 406, for example, at the application layer 420.

However, in instances where the image pipeline layer 402 is unable to read a suspected symbol or symbol indicator, the application layer 420 receives the image and attempts to detect the symbol. For instance, the application layer 420 may be configured to determine the type of the symbol contained in an image (or image portion). If the symbol type is known, the image (or image portion) is sent to one of n symbol readers, where "n" is an integer equal to or greater than 1. Each of the symbol readers is configured to read a different type of symbol.

In instances where the symbol reader 110 is unable to identify the symbol type, at least a portion of the image 130 containing the symbol may be sent over one or more networks to the symbol identification service 104. The symbol identification service 104 may identify and send a suitable resource 134 to either the application layer 420 or the image pipeline layer. In one example, the image pipeline layer 402 may utilize the resource 134 in the image pipeline layer 402 to read (recognize and decode) symbols of the same type. In another example, the application layer 420 may utilize the resource 134 to read (recognize and decode) symbols of the same type.

By way of example, the symbol reader 110 may receive resources to read new symbol types to, for instance, download content from a network (or combination of networks) to an electronic device. As an example, a display in a music store may display a symbol (or symbol portion) which comprises a visual hyperlink to a music track. The symbol, when read, may enable a user to access the music track. The new symbol types may also enable a user of the electronic device to download other items of interest, such as, a ring tone, a map, a schedule, etc. Furthermore, the new symbol types may also enable an electronic device to read "in-line" content such as a phone number, a coupon, airline ticket, other ticket, or a business card, etc.

As another example, the new symbol types may enable a user of the electronic device to read a hyperlink to an Internet address and/or one or more other network to, for instance, obtain an IP address of a printer. In this example, a user may upload content to the printer using the IP address to, for instance, cause the printer to print desired content comprise a picture, a business card, one or more phone numbers, passenger tickets, etc.

In all or nearly all of the examples, uploading and downloading may be implemented via Wi-Fi, for instance, various standards under IEEE Standard 802.11, Bluetooth, for instance, IEEE Standards 802.15.1-2002, 802.15.1-2005, and later versions of Bluetooth, or some combination thereof. It should be recognized, however, that the present invention may be practiced with other suitable means of uploading and downloading and that the present invention is therefore not limited to these standards.

Figure 5:
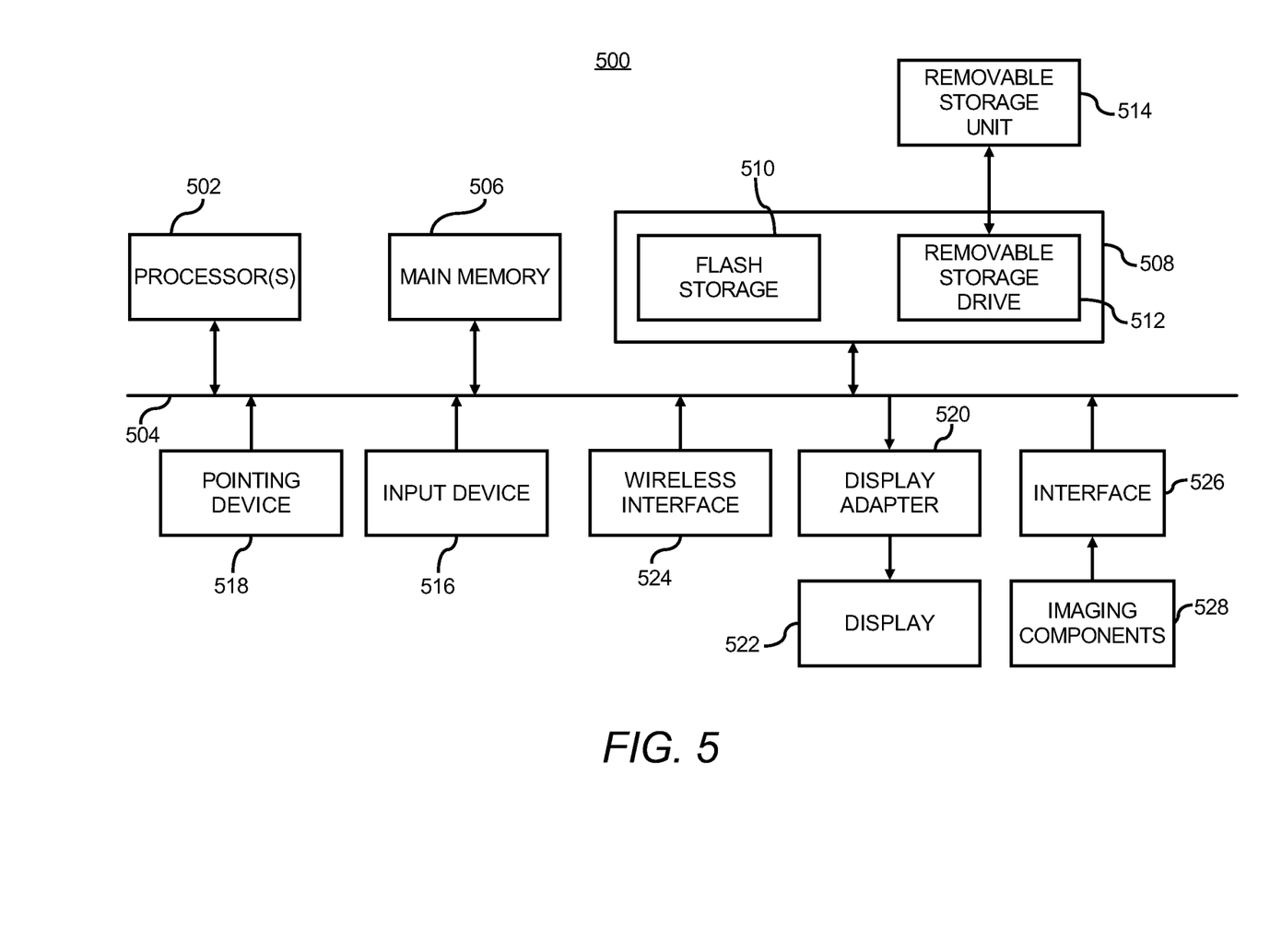
FIG. 5 shows a block diagram of a computing apparatus configured to implement or execute the methods depicted in FIGS. 2A and 2B, according to an embodiment of the invention.

FIG. 5 illustrates a block diagram of a computing apparatus 500 configured to implement or execute the methods 200 and 220 depicted in FIGS. 2A and 2B, according to an example. In this respect, the computing apparatus 500 may be used as a platform for executing one or more of the functions described hereinabove with respect to the symbol reader 110.

The computing apparatus 500 includes a processor 502 that may implement or execute some or all of the steps described in the methods 200 and 220. Commands and data from the processor 502 are communicated over a communication bus 504. The computing apparatus 500 also includes a main memory 506, such as a random access memory (RAM), where the program code for the processor 502, may be executed during runtime, and a secondary memory 508. The secondary memory 508 includes, for example, one or more flash storages 510 and/or a removable storage drive 512, representing a removable flash memory card, etc., where a copy of the program code for the methods 200 and 220 may be stored.

The removable storage drive 512 reads from and/or writes to a removable storage unit 514 in a well-known manner. The computing apparatus 400 also includes an input device 416, such as a keyboard, a keypad, functional keys, etc., a pointing device, such as a tracking ball, cursors, etc., and a display 520. A display adaptor 522 may interface with the communication bus 504 and the display 520 and may receive display data from the processor 502 and convert the display data into display commands for the display 520. The processor(s) 502 may communicate over a network, for instance, a cellular network, the Internet, LAN, etc., through a wireless interface 524. In addition, an interface 526 may be used to receive an image or sequence of images from imaging components 528.

It will be apparent to one of ordinary skill in the art that other known electronic components may be added or substituted in the computing apparatus 500. It should also be apparent that one or more of the components depicted in FIG. 5 may be optional (for instance, user input devices, secondary memory, etc.).

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

What is claimed is:

1. A method for obtaining a resource to read a symbol in an electronic device, said method comprising:
    obtaining an image containing at least one of the symbol and an indicator of the symbol;
    sending at least a portion of the obtained image to a symbol identification service, wherein the symbol identification service is separate from the electronic device; and
    receiving, in the electronic device, the resource from the symbol identification service over a network connection, wherein the electronic device is to implement the resource to read the symbol.

2. The method according to claim 1, further comprising:
at least one of:
automatically suspecting the symbol in the obtained image, wherein sending the at least a portion of the obtained image further comprises sending the at least a portion of the obtained image in response to the symbol being automatically suspected; and
receiving instructions from a user regarding at least one of a known and a suspected symbol, wherein sending the at least a portion of the obtained image further comprises sending the at least a portion of the obtained image in response to the received instructions.

3. The method according to claim 1, further comprising:
prompting a user to query the symbol identification service to obtain the resource; and
wherein sending the at least a portion of the obtained image further comprises sending the at least a portion of the obtained image in response to receipt of an instruction from the user to query the symbol identification service.

4. The method according to claim 3, wherein obtaining an image further comprises obtaining a high resolution image, and wherein sending at least a portion of the obtained image further comprises sending at least a portion of the high resolution image.

5. The method according to claim 1, further comprising:
processing the obtained image to enhance at least one of the symbol and the indicator of the symbol; and
wherein sending at least a portion of the obtained image further comprises sending at least a portion of the processed image.

6. The method according to claim 1, further comprising:
processing the obtained image to reduce a bandwidth required to transmit the at least a portion of the obtained image; and
wherein sending at least a portion of the obtained image further comprises sending at least a portion of the processed image.

7. The method according to claim 1, further comprising:
implementing, in the electronic device, the resource to read the symbol.

8. The method according to claim 1, further comprising:
determining, in the electronic device, whether the symbol is recognized; and
wherein sending the at least a portion of the obtained image to the symbol identification service further comprises sending the at least a portion of the obtained image to the symbol identification service in response to a determination that the symbol is not recognized in the electronic device.

9. An apparatus for reading a symbol, said apparatus comprising:
an image receiving module to obtain an image containing at least one of the symbol and an indicator of the symbol;
an image output module to send at least a portion of the obtained image to a symbol identification service, wherein the symbol identification service comprises an entity that is separate from the electronic device;
a resource receiving module to receive a resource from the symbol identification service, wherein the apparatus is to implement the resource to read the symbol; and
a processor to implement at least one of the image receiving module, the image output module, and the resource receiving module.

10. The apparatus according to claim 9, further comprising:
a symbol recognition module to determine whether the image contains at least one of the symbol and an indicator of the symbol, wherein the symbol recognition module is to implement the resource in reading the symbol.

11. The apparatus according to claim 10, wherein the symbol recognition module is to determine that the symbol is not recognized and wherein the image output module is to send at least a portion of the obtained image to the symbol identification service in response to a determination by the symbol recognition module that the symbol is not recognized.

12. The apparatus according to claim 9, wherein the symbol recognition module is to process the image by at least one of altering a characteristic of the image and reducing a bandwidth required to send the image.

13. A non-transitory computer readable storage medium on which is stored machine readable instructions that when executed by a processor cause the processor to:
obtain an image containing at least one of the symbol and an indicator of the symbol;
send at least a portion of the obtained image to a symbol identification service over a network connection;
receive the resource from the symbol identification service; and
implement the resource to read the symbol.

14. The non-transitory computer readable storage medium according to claim 13, wherein the machine readable instructions are further to cause the processor to:
at least one of:
automatically suspect the symbol in the obtained image, wherein, to send the at least a portion of the obtained image to the symbol identification service over the network connection, the machine readable instructions are further to cause the processor to send the at least a portion of the obtained image in response to the symbol being automatically suspected, and
receive instructions from a user regarding at least one of a known and a suspected symbol, wherein, to send the at least a portion of the obtained image to the symbol identification service over the network connection, the machine readable instructions are further to cause the processor to send the at least a portion of the obtained image in response to the received instructions.

15. The computer readable storage medium according to claim 13, wherein the machine readable instructions are further to cause the processor to:
prompt a user to query the symbol identification service to obtain the resource; and
wherein, to send the at least a portion of the obtained image to the symbol identification service over the network connection, the machine readable instructions are further to cause the processor to send the at least a portion of the obtained image in response to receipt of an instruction from the user to query the symbol identification service.

16. The non-transitory computer readable storage medium according to claim 13, wherein the machine readable instructions are further to cause the processor to:
obtain a high resolution image; and
send at least a portion of the high resolution image.

17. A method comprising:
receiving, over a network connection from an electronic device, at least a portion of an image containing at least one of a symbol and an indicator of the symbol;

processing the at least a portion of the image to recognize the symbol;

identifying, by a processor, a resource to be implemented by the electronic device to read the symbol; and sending the resource to the electronic device over the network connection.

18. The method according to claim 17, wherein the electronic device comprises a symbol reader to implement the resource to read the symbol, and wherein identifying the resource further comprises identifying a resource that is compatible with the symbol reader.

* * * * *

UNITED STATES PATENT AND TRADEMARK OFFICE
CERTIFICATE OF CORRECTION

PATENT NO. : 8,500,004 B2
APPLICATION NO. : 13/125571
DATED : August 6, 2013
INVENTOR(S) : Timothy Paul James Kindberg et al.

Page 1 of 1

It is certified that error appears in the above-identified patent and that said Letters Patent is hereby corrected as shown below:

In the Claims:

In column 12, line 47, in Claim 15, after "The" insert -- non-transitory --.

Signed and Sealed this
Sixth Day of May, 2014

Michelle K. Lee
*Deputy Director of the United States Patent and Trademark Office*